United States Patent [19]

Su et al.

[11] Patent Number: 4,773,893
[45] Date of Patent: Sep. 27, 1988

[54] SPROCKET TOOTH SPEED VARYING SPROCKET ASSEMBLY

[75] Inventors: Chung-Hsing Su, Taichung Hsien; Shun-Chih Chen, Kaohsiung, both of Taiwan

[73] Assignee: Te-Sheng Chang, Taiwan

[21] Appl. No.: 39,684

[22] Filed: Apr. 20, 1987

[51] Int. Cl.$^4$ .............................................. F16H 55/30
[52] U.S. Cl. ...................................... 474/152; 474/160
[58] Field of Search ............... 474/152, 158, 160, 162, 474/164

[56] References Cited

U.S. PATENT DOCUMENTS 3,772,932 11/1973 Nagano ................................ 474/160
4,181,033 1/1980 Nagano ............................ 474/160 X Primary Examiner—Thuy M. Bui
Attorney, Agent, or Firm—Breneman & Georges

[57] ABSTRACT

A speed varying sprocket wheel assembly for use in combination with a transmission chain comprises a plurality of sprocket wheels with different number of teeth and mounted coaxially adjacent to one another so as to permit the chain to be shifted from one to the other, each tooth being defined by a tip face, two circumferential sides, and two axial sides and having a notch at a corner formed by the tip face, one of the circumferential sides and one of the axial sides so that the tip face has a circumferential edge with a reduced circumferential dimension and an axial edge with a reduced axial dimension, the notches being arranged at the forward side of the teeth relative to the direction of the rotation of the sprocket wheels.

8 Claims, 5 Drawing Sheets

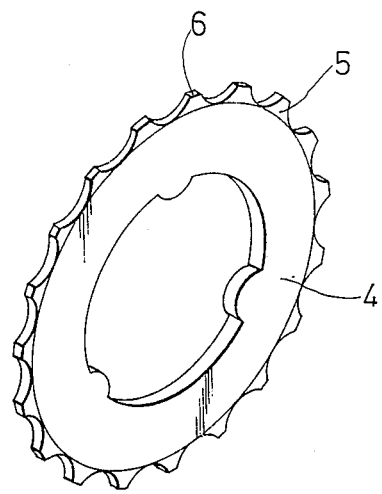
FIG.1
PRIOR ART
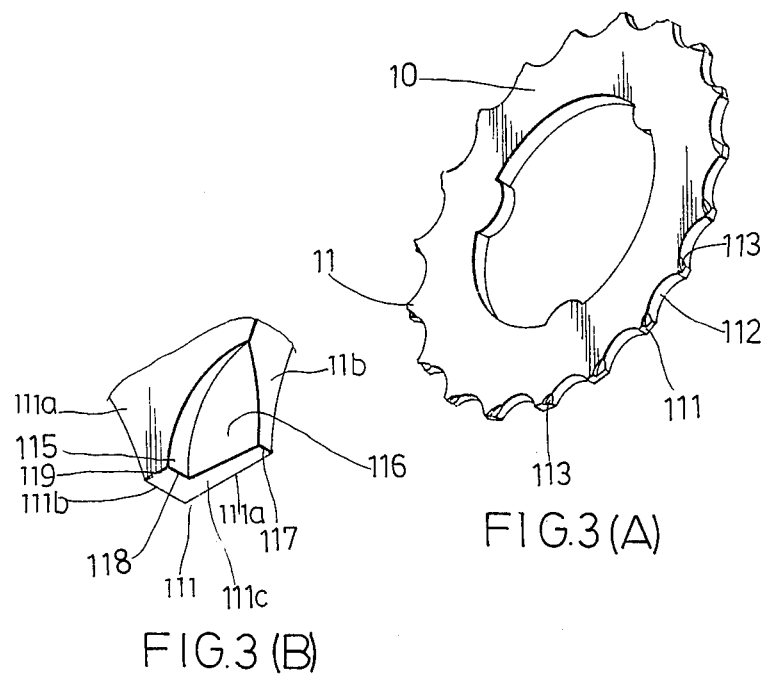
FIG.3(A)
FIG.3(B)

SPROCKET TOOTH SPEED VARYING SPROCKET ASSEMBLY

BACKGROUND OF THE INVENTION

This invention relates to a speed varying sprocket assembly, and particularly to a sprocket tooth construction of a sprocket freewheel assembly for a vehicle such as a bicycle.

Speed variable bicycles are now popular since they are adaptable for being operated at different geographical conditions. A typcial speed variable bicycle includes a sprocket freewheel assembly having a plurality of sprockets with different numbers of teeth mounted coaxially on a rear wheel assembly thereof, and a derailleur which is connected to an operating handle by means of a cord. By operating the handle, a transmission chain can be shifted from one of the sprockets to another, that is to say, the chain can be raised from a sprocket of smaller number of teeth to another sprocket of greater number of teeth or it can be lowered to a sprocket of more teeth to another sprocket of fewer teeth. As shown in FIG. 1, the teeth 5 of a conventional sprocket 4 usually has a tooth tip 6 with a rectangular cross-section; in other words, with a cross-section having a uniform circumferential length and a uniform axial width. In shifting a transmission chain from one of the wheels to a next wheel, such a tooth tip construction does not permit a rapid release of the chain from the teeth of the former wheel or a rapid engagement of the chain with the teeth of the next wheel, thereby requiring a long path of rotation to complete the chain shifting operation. In some cases, the chain can not be shifted to the next wheel smoothly, thus causing undesirable friction to the teeth. Moreover, due to the above mentioned tooth tip construction, it is somewhat difficult to manipulate the operating handle and the derailleur so as to set them in a desired position.

SUMMARY OF THE INVENTION

It is an object of the invention to provide a sprocket wheel with a novel tooth construction for use in speed varying sprocket wheel assemblies, by which the above mentioned disadvantages can be eliminated.

The present invention provides a speed varying sprocket wheel assembly for use in combination with a transmission chain which comprises: a plurality of sprocket wheels each having a different number of teeth from the other and mounted coaxially adjacent to one another so as to permit the chain to be shifted from one to the other, each tooth being defined by a tip face, two circumferential sides, and two axial sides and having a notch at a corner formed by the tip face, one of the circumferential sides and one of the axial sides so that the tip face has a circumferential edge with a reduced circumferential dimension and an axial edge with a reduced axial dimension, the notches being arranged at the forward side of the teeth relative to the direction of the rotation of the sprocket wheels.

In one aspect of the invention, the sprocket wheels are mounted in such a manner that the number of teeth increases gradually from the smallest number of teeth to the greatest number of teeth, and the notches are arranged at the forward side of the teeth relative to a direction toward the sprocket wheel with the greatest number of teeth.

In another aspect of the invention, the dimension of the circumferential edge is reduced to ½ of the original length of the tip face, and the dimension of the axial edge is reduced to ½ of the original width of the tip face.

The present exemplary preferred embodiment will be described in detail with reference to the following drawings:

BRIEF DESCRIPTION OF THE DRAWINGS

FIG. 1 is a view of a conventional sprocket wheel;

FIG. 3a is a perspective view of a sprocket wheel constructed according to the present invention;

FIG. 3b is a perspective view of a tooth of the sprocket wheel of FIG. 3a;

DETAILED DESCRIPTION OF THE PREFERRED EMBODIMENT

Figure 2:
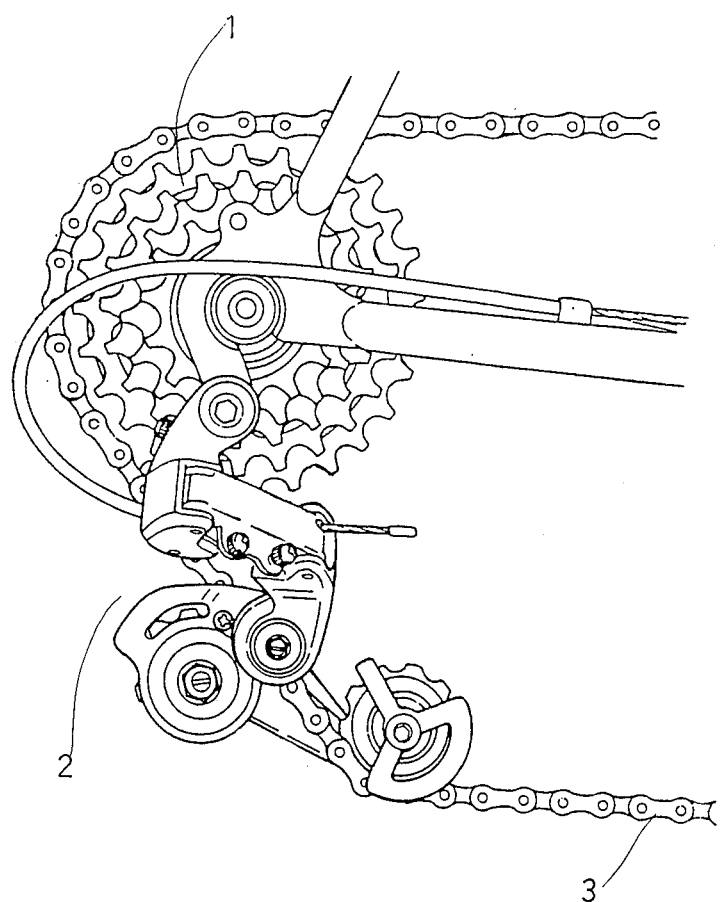
FIG. 2 is a view of a sprocket freewheel assembly of a bicycle incorporating the present invention.

Referring in FIGS. 2, 3a and 3b, there is shown a speed varying transmission system for a bicycle arranged in a conventional manner and includes a speed varying sprocket freewheel assembly 1, a derailleur 2 connected to the assembly 1, and a transmission chain 3 passing over the assembly 1. By operating an operating handle of the bicycle, the derailleur 2 will cause the chain 3 to shift from one of the sprocket wheels to another.

The sprocket assembly 1 includes a plurality of sprockets 10 which are constructed according to the present invention and each of which has a different number of teeth from the other. The sprockets 10 are mounted coaxially in such a manner that the number of teeth increases gradually towards the plane of the rear wheel of the bicycle. According to the present invention, each sprocket 10 has at its periphery grooves 112 and teeth 11 each with a tip 111 having a notche 113. Each tooth tip portion 111 is defined by two circumferential sides 111a, two axial sides 111b and a tip face 111c, and each notch 113 is arranged at a corner formed by one of the circumferential sides 111a, one of the axial sides 111b and the tip face 111c. Preferably, the tooth tip 111 so notched has an axial edge 117 adjacent to the notch 113 whose dimension is reduced to ⅓ of the original width of the tip face 111c, and a circumferential edge 119 adjacent to the notch 113 whose dimension is reduced to ½ of the original length of the tip face 111c. The notch 113 is so arranged that it is defined by a first face 116 which inclines a plane perpendicular to the axis of the sprocket 10 and a second cut 115 which extends perpendicularly with respective to said plane from the first face to the circumferential side 111a and is curved to extend from the tip face 111c to the axial side 111b.

Figure 4A:
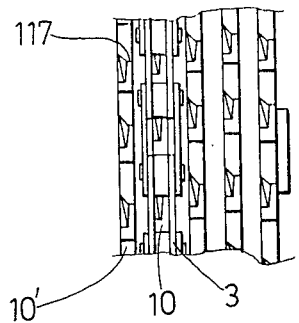
FIGS. 4a to 4c show the operation of shifting a chain from one sprocket wheel with a smaller number of teeth to another with the greatest number of teeth.
Figure 4B:
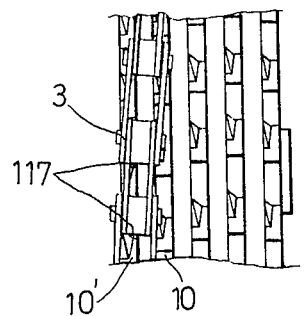
Figure 4C:
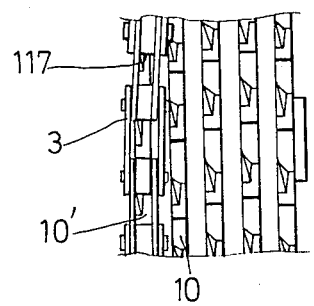

Referring to FIGS. 4a, 4b and 4c, when the transmission chain 3 is shifted from a left sprocket 10 to a right sprocket 10' which has the greatest number of teeth, the edges 117 of the teeth 11 of the sprocket 10' which have a reduced axial width extend easily into the chain 3 and the inclined face 116 guide the chain 3 to let it rise from the sprocket 10, thereby enabling the teeth of the sprocket 10' to catch the chain 3 rapidly.

Figure 5:
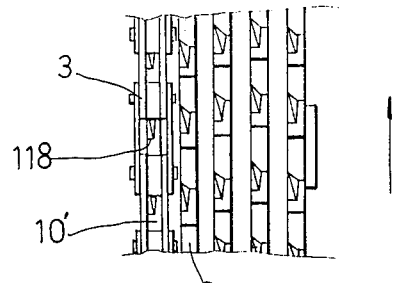
FIGS. 5a to 5b show the operation of shifting a chain from one sprocket wheel with the greatest number of teeth to another with a smaller number of teeth.
Figure 5:
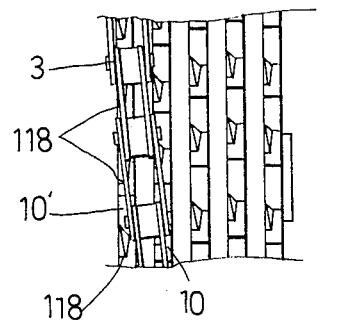
Figure 5:
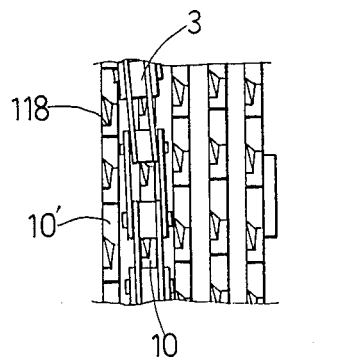

Referring to FIGS. 5a, 5b and 5c, when the chain 3 is shifted from the left sprocket 10' to the right sprocket 10, the faces 115 and the edges 118 of the notched teeth of the sprocket 10' guides the chain 3 so as to let escape rapidly from the sprocket 10' and descend to the sprocket 10.

Figure 6:
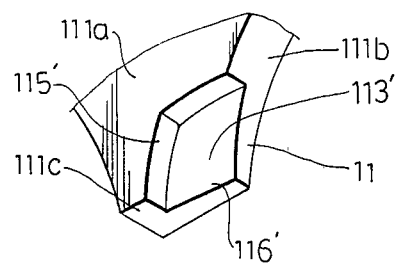
FIG. 6 is a view of another embodiment of the tooth of the sprocket wheel.

Referring to FIG. 6, the notch of the tooth 11 of the sprocket wheel 10 can be arranged as that indicated by 113' which is defined by a face 116' parallel to a plane perpendicular to the axis of the wheel 10, and a face 115' which extends perpendicularly from the face 116' to the circumferential face 111a and is angled to extend from the tip face 111c to the axial side 111b.

Figure 7:
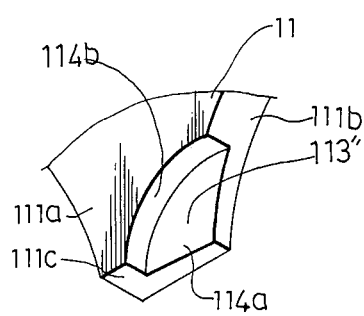
FIG. 7 is a view of still another embodiment of the tooth of the sprocket wheel.

Referring to FIG. 7, the notch of the tooth 11 of the sprocket wheel 10 can also be arranged as that indicated by 113" which is defined by a face 114a perpendicular to the axis of the wheel 10, and a face 114b which extends perpendicularly from the face 114a and is curved to extend from the tip face 111c to the axial side 111b.

With the invention thus explained, it is apparent that various modifications and variations can be made without departing from the scope of the invention. It is therefore intended that the invention be limited as indicated in the appended claims.

What is claimed is:

1. A speed varying sprocket wheel assembly for use in combination with a transmission chain comprising;
    a plurality of sprocket wheels each having a different number of teeth from the other and mounted coaxially adjacent to one another so as to permit the chain to be shifted from one to the other, each of said teeth being defined by a tip face, two circumferential sides, and two axial sides and each of said teeth having a notch at a corner formed by said tip face, one of said circumferential sides and one of said axial sides so that said tip face has a circumferential edge with a reduced circumferential dimension and an axial edge with a reduced axial dimension, said notches being arranged at the forward side of said teeth relative to the direction of the rotation of said sprocket wheels, said notches defining a first notched edge essentially parallel to said axial sides and a second notched edge angled to said circumferential edge.

2. The speed varying sprocket wheel assembly as claimed in claim 1, in which said sprocket wheels are mounted in such a manner that the number of teeth increases gradually from the smallest number of teeth to the greatest number of teeth, wherein said notches are disposed in an axial edge at a forward side of said teeth and a circumferential edge opposing one of said sprocket wheels with the greatest number of teeth.

3. The speed varying sprocket wheel assembly as claimed in claim 1, wherein the dimension of said circumferential edge receiving said notch is reduced to ⅓ of the original circumferential length of said tip face.

4. The speed varying sprocket wheel assembly as claimed in claim 1, wherein the dimension of said axial edge receiving said notch is reduced to ½ of the original axial width of said tip face.

5. The speed varying sprocket wheel assembly as claimed in claim 1, wherein each of said notches is defined by a first face which inclines a plane perpendicular to the axis of said sprocket wheel, and a second curved face perpendicular to said first face and extending from said first face to said one circumferential side, said second face further extending from said tip face to said one axial side.

6. The speed varying sprocket wheel assembly as claimed in claim 1, wherein each of said notches is defined by a first face parallel to a plane perpendicular to the axis of said sprocket wheel, and a second curved face perpendicular to said first face and extending from said first face to said one circumferential side, wherein said second face extends from said tip face to said one axial side.

7. The speed varying sprocket wheel assembly as claimed in claim 1, wherein each of said notches is defined by a first face parallel to a plane perpendicular to the axis of said sprocket wheel, and a second face perpendicular to said first face, said second face extending from said first face to said one circumferential side and angled to extend from said tip face to said one axial side.

8. A sprocket wheel assembly for use in combination with an endless transmission chain comprising;
    (a) a cluster comprising a plurality of sprockets of different circumferences and having a different number of chain engaging teeth, said sprockets arranged in a coaxial spaced parallel relationship of diminishing circumference;
    (b) said chain engaging teeth comprising a tip face, a first circumferential edge adjacent a sprocket of greater circumference in said cluster, a second circumferential edge essentially parallel to said first circumferential edge, a leading axial edge and a trailing axial edge, said leading and trailing axial edges disposed essentially perpendicular to said circumferential edges;
    (c) a notch disposed in each of said teeth extending between said leading edge and first circumferential edge defining a first notch edge essentially parallel to said first circumferential edge and a second notch edge essentially perpendicular with respect to said first circumferential edge;
    (d) said notch further being disposed in said teeth whereby said notch extends about ½ the width of said leading edge and about ⅔ the length of said first circumferential edge.

* * * * *